United States Patent
Pearson

(10) Patent No.: US 7,233,648 B2
(45) Date of Patent: Jun. 19, 2007

(54) METHOD AND APPARATUS FOR A TELEPHONE USER INTERFACE CONTROL FOR ENABLING AND DISABLING A WEB INTERFACE

(75) Inventor: Larry B. Pearson, San Antonio, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 10/946,706

(22) Filed: Sep. 22, 2004

(65) Prior Publication Data

US 2006/0062359 A1    Mar. 23, 2006

(51) Int. Cl.
*H04M 1/64* (2006.01)
(52) U.S. Cl. ............... 379/88.17; 379/88.13; 379/88.18; 379/201.02; 379/201.12; 370/352
(58) Field of Classification Search ............. 379/88.17, 379/88.18, 201.02, 201.12, 88.13; 370/352
See application file for complete search history.

(56) References Cited

U.S. PATENT DOCUMENTS

| | | | |
|---|---|---|---|
| 6,442,243 B1 | 8/2002 | Valco et al. | |
| 6,563,912 B1* | 5/2003 | Dorfman et al. | 379/88.13 |
| 6,584,097 B1* | 6/2003 | Malik | 370/352 |
| 6,778,642 B1* | 8/2004 | Schmidt et al. | 379/88.13 |
| 2003/0108167 A1* | 6/2003 | Fernandez | 379/88.13 |
| 2003/0120957 A1* | 6/2003 | Pathiyal | 713/202 |
| 2003/0190908 A1 | 10/2003 | Craven | |
| 2004/0008827 A1 | 1/2004 | Martin et al. | |
| 2004/0131081 A1 | 7/2004 | Bhatia et al. | |
| 2004/0252814 A1* | 12/2004 | Eakin | 379/88.17 |
| 2004/0252815 A1* | 12/2004 | Lennox | 379/88.22 |
| 2005/0047563 A1* | 3/2005 | Fellenstein et al. | 379/88.22 |

* cited by examiner

*Primary Examiner*—Fan Tsang
*Assistant Examiner*—Hemant Patel
(74) *Attorney, Agent, or Firm*—Madan, Mossman & Sriram, P.C.

(57) ABSTRACT

The present invention provides a method and apparatus to activate or deactivate a web interface to a voicemail system through a telephone user interface to the voicemail system. During a setup procedure that runs on the first use of the telephone user interface, the method and apparatus asks the subscriber if the subscriber wants the web interface activated. The method and apparatus then activates the web interface and allows the subscriber to specify a sequence of both digits and letters as the subscriber's initial web password and username. The present invention also provides the capability to activate or deactivate the web interface via the telephone user interface at any time after the initialization.

30 Claims, 8 Drawing Sheets

| POVM/UMS Initialization Information | | | |
|---|---|---|---|
| Information | TUI or Web | POVM | UMS |
| Mailbox Number | both | Yes | Yes |
| Access Number | TUI | Yes | Yes |
| Temporary PIN | TUI | Yes | Yes |
| URL | Web | No | Yes |
| Temporary Username | Web | No | Yes |
| Temporary Password | Web | No | Yes |

100 — (table)
102 — Information row
104 — Mailbox Number
106 — Access Number
108 — Temporary PIN
110 — URL
112 — Temporary Username/Password

| POVM/UMS Initialization Information | | | |
|---|---|---|---|
| Information | TUI or Web | POVM | UMS |
| Mailbox Number | both | Yes | Yes |
| Access Number | TUI | Yes | Yes |
| Temporary PIN | TUI | Yes | Yes |
| URL | Web | No | Yes |
| Temporary Username | Web | No | Yes |
| Temporary Password | Web | No | Yes |

METHOD AND APPARATUS FOR A TELEPHONE USER INTERFACE CONTROL FOR ENABLING AND DISABLING A WEB INTERFACE

BACKGROUND OF THE INVENTION

1. Field of the Invention

The present invention relates to the field of telecommunications. More particularly, the present invention relates to telephone user interface controls for a web interface to a voicemail box provided in a Unified Messaging Service telephone system.

2. Background Information

Currently, enhanced service providers (ESP) offer Plain Old Voicemail (POVM) and Unified Messaging Service (UMS) as separate products. POVM and UMS both require their own Uniform Service Order Codes (USOC), their own pricing, and potentially own provisioning flows. Recently, a need has surfaced to include UMS in bundles as a replacement for POVM. Like POVM, UMS also requires that the subscriber initialize the UMS Telephone User Interface (TUI). In addition to the TUI initialization that is found in POVM, UMS also requires that the subscriber initialize a UMS web interface over the Internet. There are many people, however, that are still not on the Internet. Moreover, a substantial portion, perhaps 30 percent of the subscriber base purchasing UMS in bundles to replace POVM will not have access to the Internet.

Those UMS subscribers without Internet access cannot initialize their UMS web interface over the Internet leaving their UMS web interface to their voicemail box un-initialized. These un-initialized web interfaces to voicemail mailboxes are subject to hacking.

Telephone hackers have discovered ways to make "free" long distance (overseas) calls by hacking into voicemail boxes. One hacking scheme involves changing a voicemail box's greeting to say "yes" at just the right time. Then, when the hacker makes a third party billing call using a carrier, the carrier's speech recognition system will assume that the "yes" provided by the hacked mailbox greeting means that the carrier has received authorization to bill a third party call to the telephone number associated with the mailbox.

Computer hackers would find it relatively straightforward to write programs to find the un-initialized web interface to the voicemail mailboxes. Uninitialized web interfaces are typically setup with the subscriber's telephone number as the temporary password and username. All a hacker would need to do to hack into an uninitialized web interface is duplicate the web login process programmatically and then try each telephone number in a telephone number range. Normally the time to run such a program would be quite long, however, given that web interfaces on these mailboxes would remain un-initialized for long periods of time, this gives the hacker plenty of time to try every single combination telephone number until the correct number is tried and access to the mailbox granted for illegitimate purposes.

Thus there is a need to provide a solution to the hijacking problem associated with un-initialized voicemail boxes.

SUMMARY OF THE INVENTION

The present invention provides a method and an apparatus for a voicemail service. The method includes providing a first interface (for example, an Internet based World Wide Web interface) to the voicemail service over a data network (for example, the Internet) and a second interface (for example, a telephone user interface) to the voicemail service via a telephone. Information to configure the first interface is stored so that the user can manipulate the information to configure the first interface via the telephone. The first interface may be a web interface that enables the user to communicate with the voicemail service via the Internet and the second interface may be a telephone user interface that enables the user to configure the web interface and access the voicemail service via the telephone.

The method of the present invention also may provide initial default settings for the web interface, which may include a setting that prevents access to the voicemail service over the internet. The method further enables the user to change the default initial settings to set the web interface to provide access to the voicemail service via the Internet. The method further provides the user with a user name and password for the web interface.

The apparatus of the present invention includes a first interface that allows access to the voicemail service over a data network and a second interface that enables the user to configure the first interface over a telephone. The first interface may be a web interface that communicates with the voicemail service over the Internet. The second interface may be part of a switched public telephone network that communicates with the voicemail service and with the web interface over the telephone thereby enabling the user to configure the web interface via the telephone. The system includes initial default settings that may be reconfigured by the user.

The invention further provides a computer readable medium that contains instructions that when executed perform a method for providing a voicemail service. The method provides a web interface and a user telephone interface to the voicemail service. The web interface enables the user access to the voicemail service over the internet and the user telephone interface enables the user to configure the web interface via a telephone.

Examples of the certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description, taken in conjunction with the accompanying drawings, in which like elements have been given like numerals.

FIG. 1 illustrates an example of the information provided to a subscriber to access POVM and UMS voicemail;

DETAILED DESCRIPTION OF THE PREFERRED EMBODIMENTS

Figure 2:
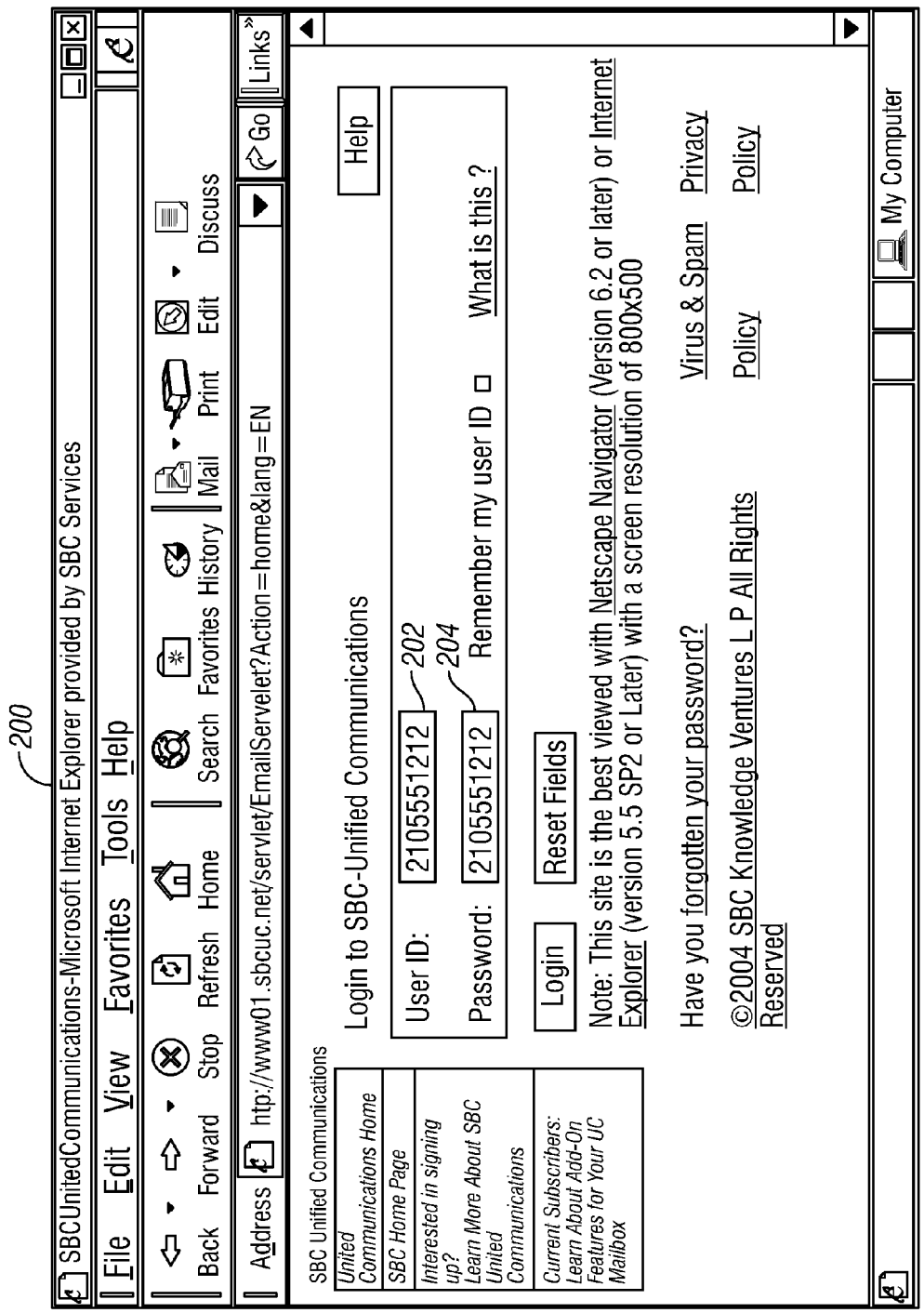
FIG. 2 illustrates an example of a configuration access screen available to a user via a graphical user interface (GUI) in the present example of the invention.

The present invention provides a solution to the problems associated with un-initialized voicemail boxes discussed above. The present invention provides a method and apparatus to activate or deactivate the web interface to voicemail through a telephone user interface. During a setup procedure that runs on the first use of the telephone user interface, the method and apparatus of the present invention asks the subscriber if they want the web interface activated. If they do, the present invention activates the web interface and allows the subscriber to specify a multiple digit and letter sequence as their initial web password. The present invention also provides the capability to activate or deactivate the web interface at any time after the initialization.

In either a POVM or UMS voicemail system, voicemail subscribers need information on how to access the voicemail service. These are initial default parameters provided by the voicemail system to allow a user initial access to voicemail. There are additional schemes for assigning temporary passwords such as assign a subscriber's account number as their initial temporary password. The information needed to access POVM and UMS voicemail service is illustrated in FIG. 1. The Mailbox Number 102 is the Working Telephone Number (WTN) that has either POVM or UMS associated with it. The Access Number 104, often referred to as the call forwarding number, is used to retrieve messages over the telephone. The Temporary Personal Identification Number (PIN) 106 is typically automatically set through the order process to be either the last 4 or last 7 digits of the subscriber's telephone number (WTN).

The URL 108, in the case of the UMS is selected by the ESP. An example of an ESP URL is http://www.ESP-NAME.net. The Temporary Username 110 is the subscriber's 10 digit telephone number (WTN). The Temporary Password 112 is typically the last 7 digits of the subscriber's telephone number (WTN). The temporary username and password scheme makes it easy for a subscriber to remember their temporary password and user name because they are associated with the subscriber telephone number. The temporary username and password scheme using a subscriber telephone number enables a simple process to initialize a subscriber's initial default voicemail configuration information also referred to as voicemail web interface information (VWII) in the exemplary embodiment in which the data network associated with the voicemail system is the Internet and access is provided to the voicemail system over the world wide web by providing a web interface to the voicemail system.

The Temporary User Name and Temporary Password scheme assigns passwords and username based on the subscriber telephone number, as illustrated in FIG. 1, however, makes it easy for a hacker to hijack the voicemail box. All a hacker would need to do is duplicate the web login process programmatically and then try each telephone number in a telephone number range. Computer hackers would find it relatively straightforward to write programs to find the un-initialized voicemail boxes (web interface) and hijack them. Thus, the present invention enables a user without web access to disable their web interface over the telephone.

The ability to activate/deactivate the web interface from the telephone user interface is a Class of Service (COS) parameter. Additionally, whether the web interface is defaulted to active or inactive is also a COS parameter. In the present example of the invention, a voicemail service associated primarily with UMS, the web interface is initially set to active. For a voicemail service associated with both POVM and UMS, the web interface is initially set to inactive.

Turning now to FIG. 2, an example of an existing web interface set up screen 200 provided via a UMS web server and graphical user interface is illustrated. Note that the initial temporary User ID is the 10-digit telephone number for the subscriber and the temporary password is the 7-digit telephone number for the subscriber.

Figure 3:
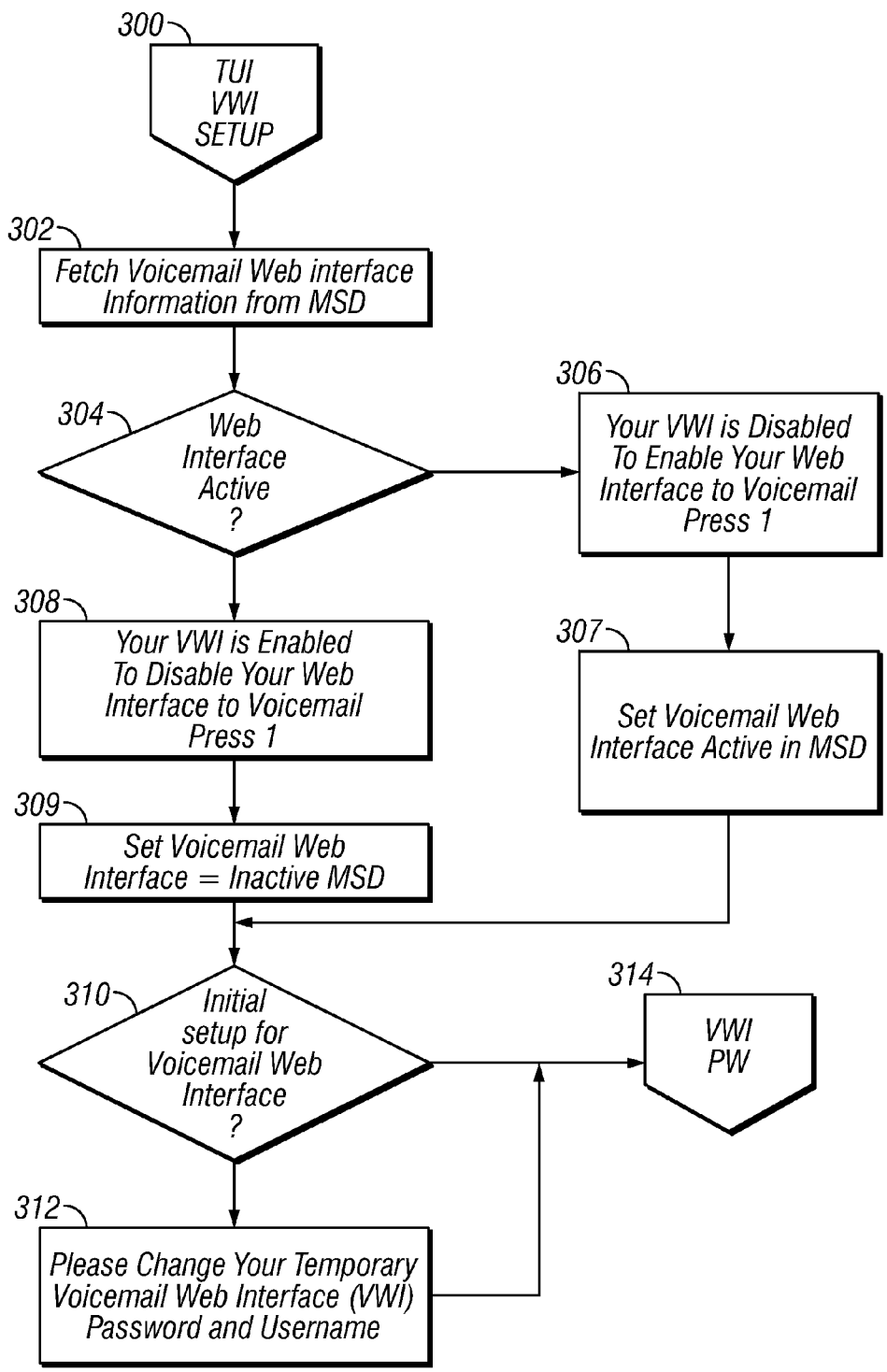
FIG. 3 illustrates the functions performed in enabling and disabling a web interface to voicemail in the present example of the invention.

Turning now to FIG. 3, the function for enabling and disabling the web interface to the voicemail box is illustrated. As shown in FIG. 3, a subscriber enters the TUI Voicemail Interface setup procedure 300 during initialization of the voicemail service. The voicemail information, including Voicemail Web Interface (VWI) Information is retrieved from the Master Directory Server (MDS) 54. The present example of the invention checks to see whether or not the VWI is enabled in the MDS VWI information at block 304. If the Voicemail Web Interface (VWI) is not enabled in the VWI information (VWII) in the MDS the present invention will proceed to block 306 and prompt the subscriber via the TUI with an announcement, "Your web interface to voicemail is disabled. To enable your web interface to voicemail, press 1."

If the Voicemail Web Interface (VWI) is set to enabled in the VWI information in the MDS the present invention proceeds to block 308 and prompts the subscriber via the TUI with an announcement, "Your web interface to voicemail is enabled. To disable your web interface to voicemail, press 1." At block 310 the present invention determines whether this is the first time the user has entered the voicemail system to setup for voicemail and override the initial system initial default settings for the VWII. If this is the initial setup for voicemail, the present invention proceeds to block 312 and prompts the user, "Please change your temporary web interface password and username at this time," and proceeds to VWI PW to prompt the subscriber to enter a password. If this is not the initial setup for voicemail, the present invention proceeds to VWI PW to prompt the user to setup a password.

Figure 4:
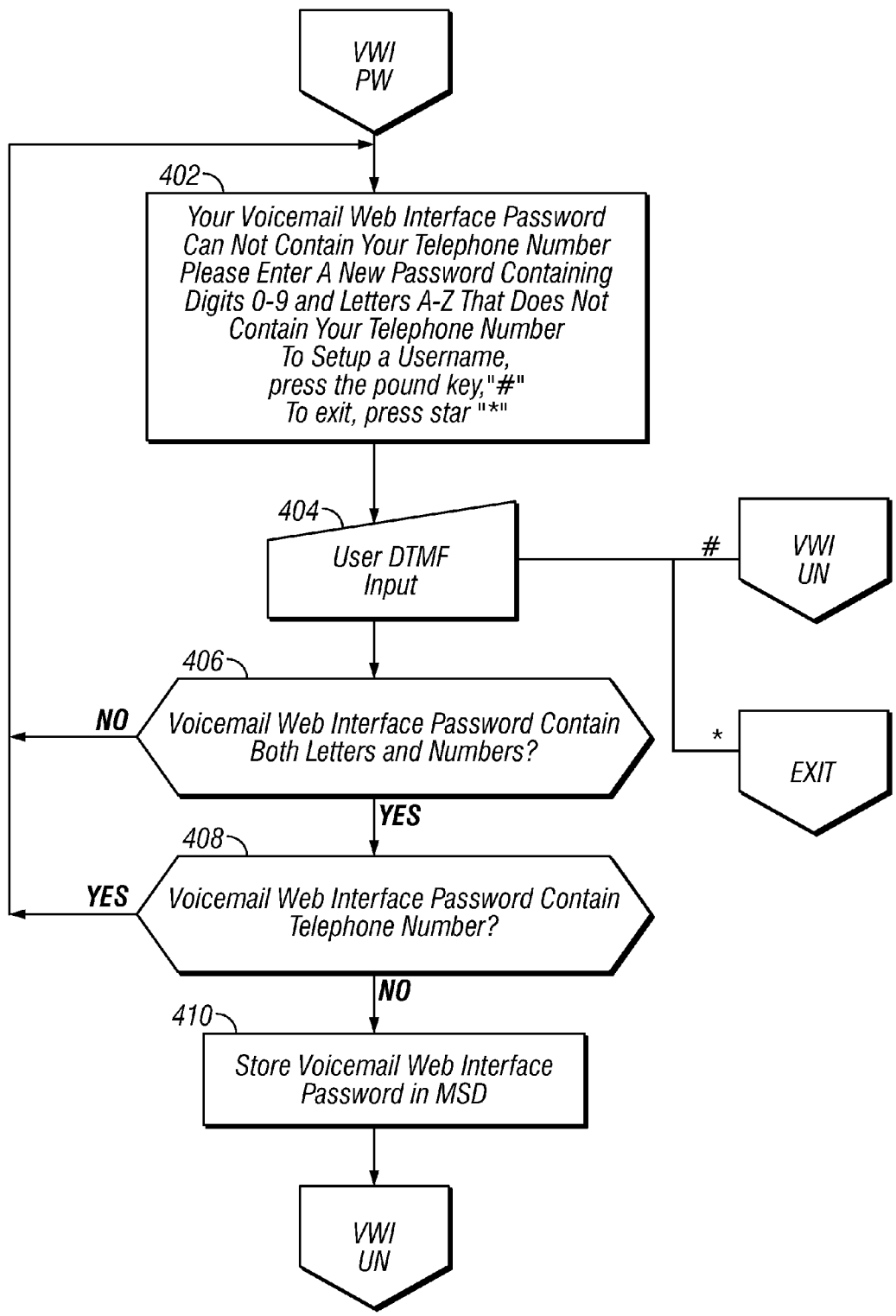
FIG. 4 illustrates the functions performed in establishing a password to a web interface to voicemail in the present example of the invention.

Turning now to FIG. 4, at block 402 the present invention prompts the subscriber via the TUI, "Your voicemail web interface password must not contain your telephone number. Please enter a voicemail web interface password consisting of digits 0–9 and letters A–Z. Your password must contain both letters and digits. To exit press star. To set up a voicemail web interface username, press #."

At block 404 the present invention receives user input from a DTMF telephone via the TUI. If the subscriber presses the pound key, "#" the present invention goes to VWI UN to set up a user name. If the subscriber presses the star key, "*" the present invention exits. At block 406 the present invention checks to see if the password entered by the subscriber contains both letters A–Z and digits 0–9. If the password does not contain both letters A–Z and digits 0–9, then the present invention returns to 402 and repeats the prompt to the subscriber. If the password does contain both letters A–Z and digits 0–9, then the present invention proceeds to VWI UN to setup a username for the voicemail web interface. It is also acceptable to allow the user to setup a password and username with all digits, however, the telephone number should be avoided as a password as it is too easy for a hacker to guess the password when it is based on the subscriber telephone number. A standard telephone may also be used with the TUI to speak the password of digits and/or letters to facilitate entry of letters which are not easily entered via a DTMF telephone key pad.

Figure 5:
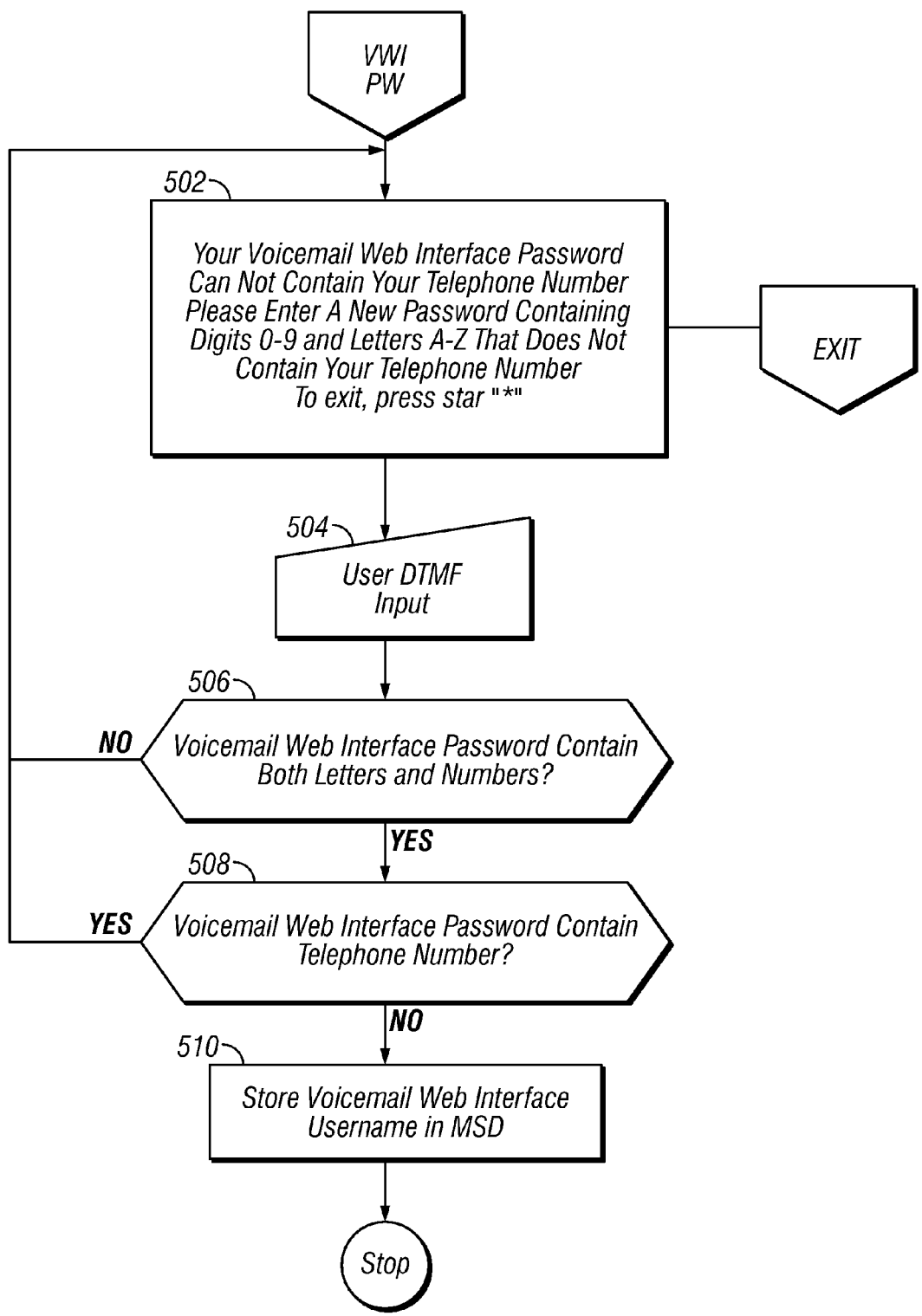
FIG. 5 illustrates the functions performed in establishing a username to a web interface to voicemail in the present example of the invention.

Turning now to FIG. 5, at block 502 the present invention prompts the subscriber via the TUI, "Your voicemail web interface username must not contain your telephone number. Please enter a voicemail web interface username consisting of digits 0–9 and letters A–Z. Your username must contain both letters and digits. To exit press star."

At block 504 the present invention receives user input from a DTMF telephone via the TUI. If the subscriber presses the pound key, "#" the present invention exits. At block 506 the present invention checks to see if the username entered by the subscriber contains both letters A–Z and digits 0–9. If the username does not contain both letters A–Z and digits 0–9, then the present invention returns to 502 and repeats the prompt to the subscriber. If the username does contain both letters A–Z and digits 0–9, then the present invention proceeds to exit the voicemail web interface setup function.

The present invention is a feature added to UMS voicemail systems. In an alternative embodiment, the present invention can be implemented in the voice network switching infrastructure in the PSTN or Advanced Intelligent Network (AIN). In the present example of the invention, when a caller calls a voicemail subscriber's telephone number and the number is busy or is not answered, the call is forwarded to a Unified Messaging Service (UMS) platform where the voicemail features of the present invention are implemented. The telephony portions of the voicemail system reside in a Telephone User Interface (TUI) and the subscriber interface and screen functions reside in the Web Server. Assuming that the subscriber has voicemail activated, the caller will be given the opportunity to go straight to voicemail to leave a message at the UMS platform.

The subscriber receives the voicemail information including web voicemail interface (VWI) information for review via GUI or TUI and voicemail information including web voicemail interface (VWI) information using either the Dual Tone Multiple Frequency (DTMF) telephone via the TUI or the GUI. The UMS platform receives the voicemail information including web voicemail interface (VWI) information from the subscriber, from either the dual tone multifrequency telephone or the graphical user interface, and communicates the voicemail information including web voicemail interface (VWI) information to a Master Directory Server (MDS), which updates the voicemail information including voicemail web interface (VWI) information. The UMS platform voicemail service then processes calls to the telephone number of the subscriber in accordance with the updated voicemail information including VWI information.

The UMS platform also includes a Web server, through which the voicemail subscriber receives at a GUI the VWI information and updates VWI information through a packet switched data network. There is also a TUI through which the subscriber receives at a dual tone multi-frequency telephone the VWI information to update the VWI information through the public switched telecommunications network.

Figure 6:
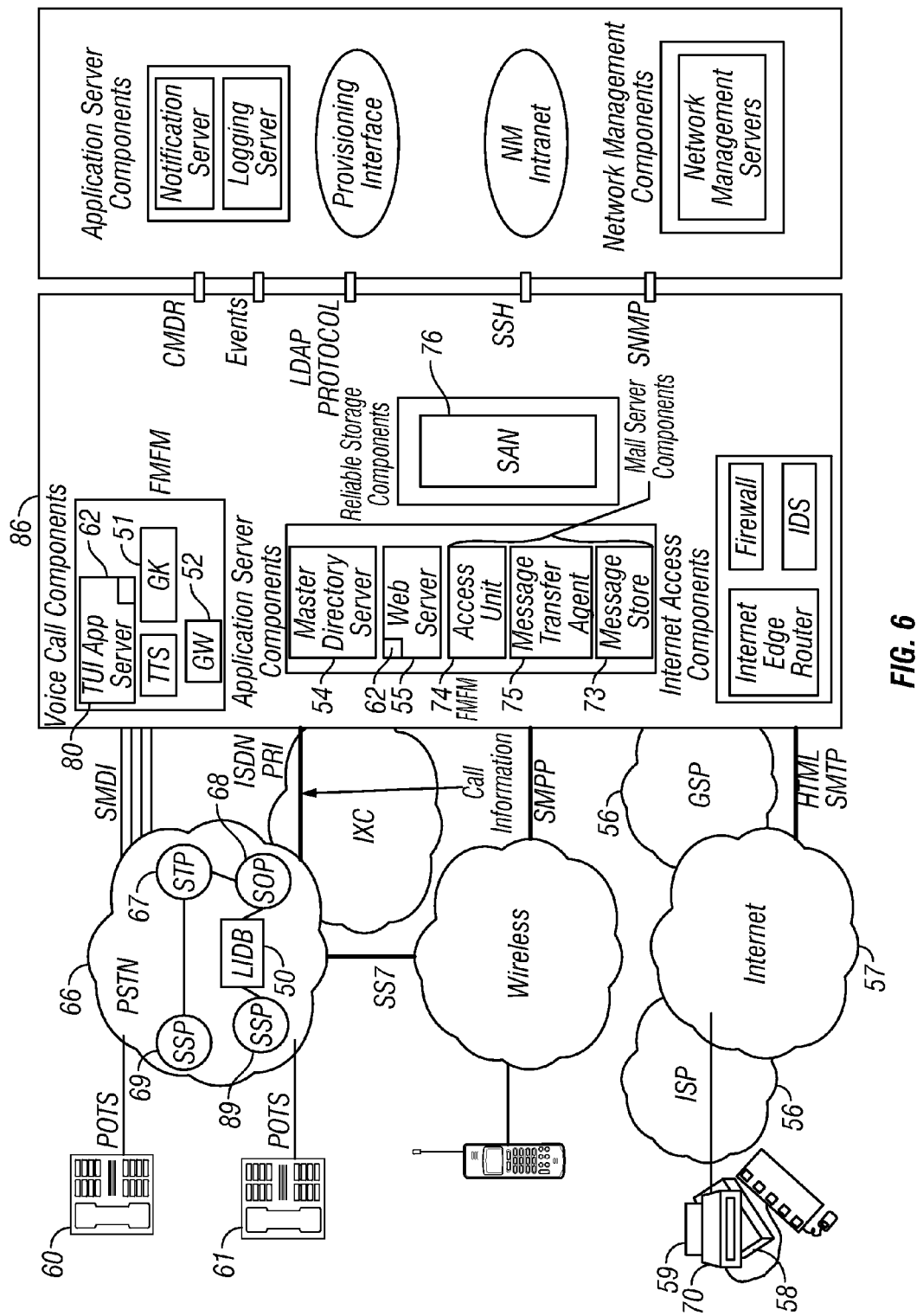
FIG. 6 illustrates an example of a high level architectural diagram of the environment in which the present example of the invention operates.

The following discussion provides further description of an exemplary embodiment of the invention. FIG. 6 illustrates a high level architectural diagram of the environment in which the present invention operates. The main components of the environment in which the present example of the invention resides comprises a public switched telephone network (PSTN) 50, Voice Over Internet Protocol (VoIP) Gateway 52, a Gatekeeper 51, TUI Application Server 80 which performs as a Gate Server, MDS 54, Web Server 55, HTML link 56, Internet 57, and Web Client 70.

A subscriber telephone 61 is shown associated with the PSTN 66 of the architectural schematic of FIG. 6. The PSTN comprises at least one Signal Transfer Point (STP), Signal Service Point (SSP) and Service Control Point (SCP) and database components are well known in the art. The voicemail system is embedded in the TUI Application Server 80 provides the features of the present invention described herein and runs on a Sun/Solaris platform at the UMS platform 66.

The Gatekeeper (GK) 51 determines where calls coming from the Voice over IP Gateway 52 should be routed. The Voice over IP Gateway (VoIP GW) 52 provides the bridge between the PSTN and the VoIP systems. A Telephone User Interface (TUI) is provided in the TUI Application Server 80. The TUI runs as a Logica CMG uOne application and is implemented on a Sun/Solaris or PC/Linux platform. The TUI provides a Text-To-Speech Server that converts text provided by the TUI into speech that is played over the telephone. The Web Server 55 provides web pages formulated from MDS content for user input for configuration of the VWI information described below. Subscribers use a browser, such as Internet Explorer (IE) or Netscape browser to access mail services over the web. The web server also provides subscribers with administrative capabilities such as setting up and configuring their voicemail account or changing their password in the VWI information. The software is provided by DCL and implemented on a Sun/Solaris or PC/Linux platform.

The Master Directory Server (MDS) 54 is implemented as a Lightweight Directory Access Protocol (LDAP) Server provides storage for VWI information such as whether the web interface to voicemail is enabled or disabled, the web interface username and web interface password, which are all stored in the MDS. The Gate Server (TUI Application Server) and Web Server components all use the MDS.

A mail server is provided comprising Access Unit 74, Message Transfer Agent 75 and Message Store 73. The Web Server and the TUI App Servers use the AU to retrieve message inventories from the Message Store. The software for the AU is provided by Data Connections Limited (DCL) running on a Sun/Solaris or PC/Linux platform. Internet mail servers including the Web Server 55 and the TUI Server 80 use the MTA to send mail. If the mail is to be delivered to the UMS platform, the MTA uses the Message Store to store the message in the subscriber's mailbox. The MTA also manages inbound and outbound mail to the Internet. The Storage Area Network (SAN) provides reliable disk storage for use by the MDS and Message Store. The SAN is implemented on EMC hardware and software.

The MS 73 provides storage for the UMS platform 66. The Mail Server through the AU and the MTA provides Web Servers and the TUI APP Servers with storage to store or retrieve messages. The Message Store holds voice messages, emails, facsimiles, voicemail greetings and voicemail name announcements. Software for the MS is provided by DCL running on a Sun/Solaris and EMC platform.

In the present example of the invention, an SSP in an originating Central Office (CO) for the caller telephone 60 sends caller information to an SSP in a terminating CO for the subscriber telephone 61. However, the terminating CO and the originating CO may be the same, or there may be any number of intervening switches routing the connection between the caller telephone 60 and the called party subscriber telephone 61. The SSP includes, for example, 1AESS or 5ESS switches manufactured by Lucent Technologies, Inc., or DMS-100 switches manufactured by Nortel Networks Corporation (Nortel), or AXE-10 switches manufactured by Telefonaktiebolaget LM Ericsson.

The 1AESS switches may use an AIN Release 0.1 protocol and should be equipped with Generic 1AE13.01 (or higher) software and associated AIN SSP features. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features. The call service logic of the present invention may be upgraded to accommodate future AIN releases and protocols and future trigger types. Specifications of AIN Release 0.1 SSPs may be found in Bellcore TR-NWT-001285, Switch-Service Control Point Application Protocol Interface Generic Requirements, the disclosure of which is expressly incorporated by reference herein in its entirety.

In the present example of the invention, an incoming call, from a calling party to the subscriber's telephone number, is received at a terminating SSP. The SSP forwards the call to the UMS platform. The SSP switch forwards the call using a "Call Forward Busy/Don't Answer" function in the SSP.

FIG. 6 illustrates an exemplary telecommunications network in association with the present invention, for implementing voicemail. The network includes a calling party 60, an originating service switching point (SSP) 69, a terminating SSP and a subscriber's telephone 61 (i.e., the call destination or the called party). The network also includes a signaling transfer point (STP) 67, a service control point (SCP) 68, TUI Application Server (also referred to as a Gate Server) and a UMS platform 66. The network also provides a name database 50 connected to the SCP 68, which can be, for example a line information database (LIDB).

By way of example, the SCP 68 is implemented with the Bellcore Integrated Service Control Point, loaded with ISCP software Version 4.4 (or higher), available from Telecordia, Murray Hill, N.J. In an alternative embodiment of the invention, the SCP 68 may be a Lucent Advantage SCP, with software release 94, available from Lucent Technologies, Inc. In the present invention an IVR is provided by the TUI Application Server. An exemplary IVR is available under the trademark CONVERSANT System for IVR, Version 6.0, Update 1, provided by Lucent Technologies, Inc. The network alternatively incorporates any compatible stand-alone IVR or advanced intelligence network-intelligent peripheral (AIN-IP or intelligent peripheral) providing an IVR.

The SSP 89 in the terminating central office (CO) (SSP) for the subscriber phone 61 and the SSP 69 is the originating CO (SSP) for the calling party 60. However, the terminating CO (SSP) and the originating CO (SSP) may be the same SSP.

A data network of the invention includes a Web Client 70, and a Web server 55, and Master Directory Server (MDS) 54 accessible through the Internet 57. The MDS is an LDAP server in the present example of the invention. The Web Client 70 includes a personal computer (PC), i.e., a graphical user interface (GUI) 59, operating client software 58, an example of which is ICW Client, available from Southwestern Bell Telephone Company. Alternatively, the client software 58 can be run at the Web server 55. The TUI Application Server 80 provides the subscriber interface to the subscriber phone 61 (or other DTMF telephone) and the Web Client 70 (or other Internet compatible GUI) through the Web server 54, via the Internet 57. The MDS also maintains VWI information for the TUI Application Server.

The Web Client 70 incorporates a Web browser, such as Microsoft Internet Explorer, available from Microsoft Corporation, or Netscape Navigator, available from Netscape Communications Corporation. In one embodiment, the Web Client 70 is implemented with an IBM Pentium based PC, running the Linux operating system, available from, for example, Free Software Foundation, Inc., or the Microsoft Windows operating system, and running the Microsoft Internet Explorer, Netscape Navigator (available from Netscape/AOL) or Hot Java (available from Sun Microsystems, Inc.) Web browser software. An exemplary embodiment of the invention includes the Web server 54 running the Linux or Microsoft Windows operating system and the Apache Web server software, available from the Apache Software Foundation, or the Jigsaw Web server software, available from World Wide Web Consortium (W3C).

A subscriber can modify the VWI information via two methods. First, from any DTMF telephone, the subscriber dials a UMS platform access for their area, to access the TUI Application Server 80. The subscriber is prompted to enter an account number, along with a personal identification number (PIN). The subscriber then has the ability to toggle the web interface on and off, setup a username and setup a password for the web interface to voicemail. Second, the subscriber has the option to access the VWI information using a GUI via the Internet 57. Over the Web connection, the subscriber is able to toggle the web interface on and off, setup a username and setup a password for the web interface to voicemail.

Figure 7:
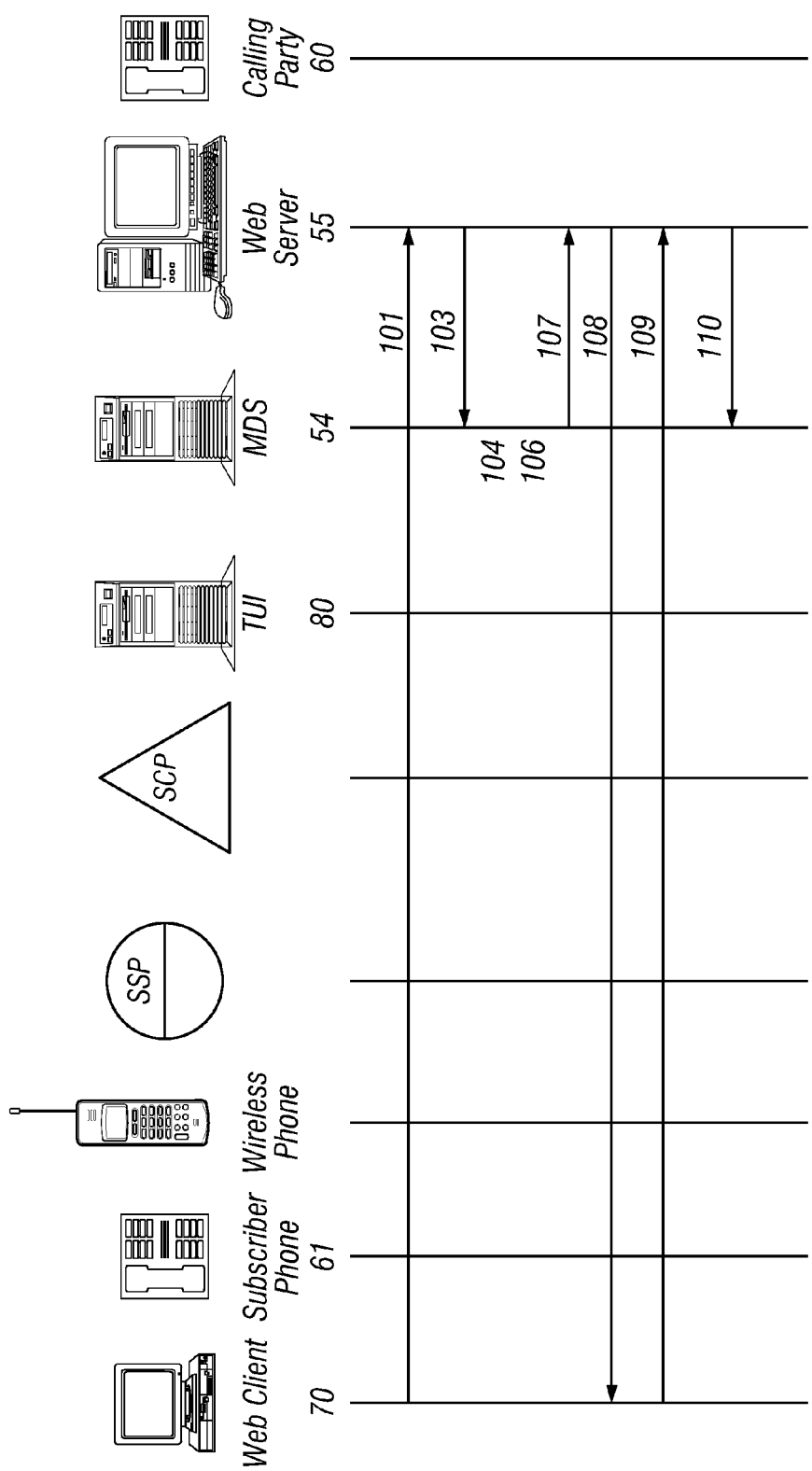
FIG. 7 depicts an example of interaction with voicemail over the Internet, using a GUI in the present example of the invention.

A subscriber's exemplary interaction with VWI information and diabled/enabled status for each VWI information as stored in the MDS is depicted in the call flow diagram of FIG. 7. The subscriber is able to access the VWI information via a telephone over the TUI Application Server or the via Internet, thereby greatly increasing flexibility and convenience of accessing the VWI information. FIG. 7 depicts interaction with voicemail over the Internet, using a GUI, for accessing and updating the VWI information discussed above. In order for the subscriber to access VWI information via the Internet 57, the subscriber accesses a unique uniform resource locator (URL) associated with the service provider. The URL is an address and identifies the appropriate protocol for communicating with the service over the Web. LDAP or MDS contains the VWI configuration information that the Web Sever uses to render web screens to the subscriber. The web screens enable the subscriber to configure the VWI information as well as review the VWI information. When the subscriber accesses the Internet, the Web server 55 provides VWI information Web screens rendered from the subscriber profiles and VWI information stored in the MDS.

As shown in FIG. 7, at step 101 the subscriber accesses VWI information by connecting from the Web Client 70 to the Web server 55 through the Internet 57. The Web server 55 then accesses the MDS 54, which stores and updates the VWI information, at step 103. The Web Server 55 receives HTTP messages from the subscriber Web Client 70 and provides HTML Web pages in response to the subscriber's input. The Web pages relate to the subscriber's VWI information, as stored in the MDS 54.

Once connected to the Web server, the Web Server uses the information stored in the MDS to decide what to show the end-user. The user provides authentication information to access the corresponding account. The Web Server performs the authentication at step 104. The Web Server queries the subscriber for an account number and associated password, which confirms the user's identity. The Web Server then retrieves the account number and associated password information the MDS to confirm that the subscriber is an authorized user. After successful authentication, the Web Server retrieves the VWI information from the MDS at step 106. The Web server 55 retrieves the VWI information form the MDS 54 at step 107. The Web Server then forwards the VWI information to Web client 70 via the Internet 57 at step 108 render web screens at the Web client. The VWI information input by the subscriber in are entered and are sent from the Web client 70 to the Web server 55 at step 109. The subscriber input is stored in the MDS 54, indicated respectively at steps 109 and 110 of FIG. 7.

Figure 8:
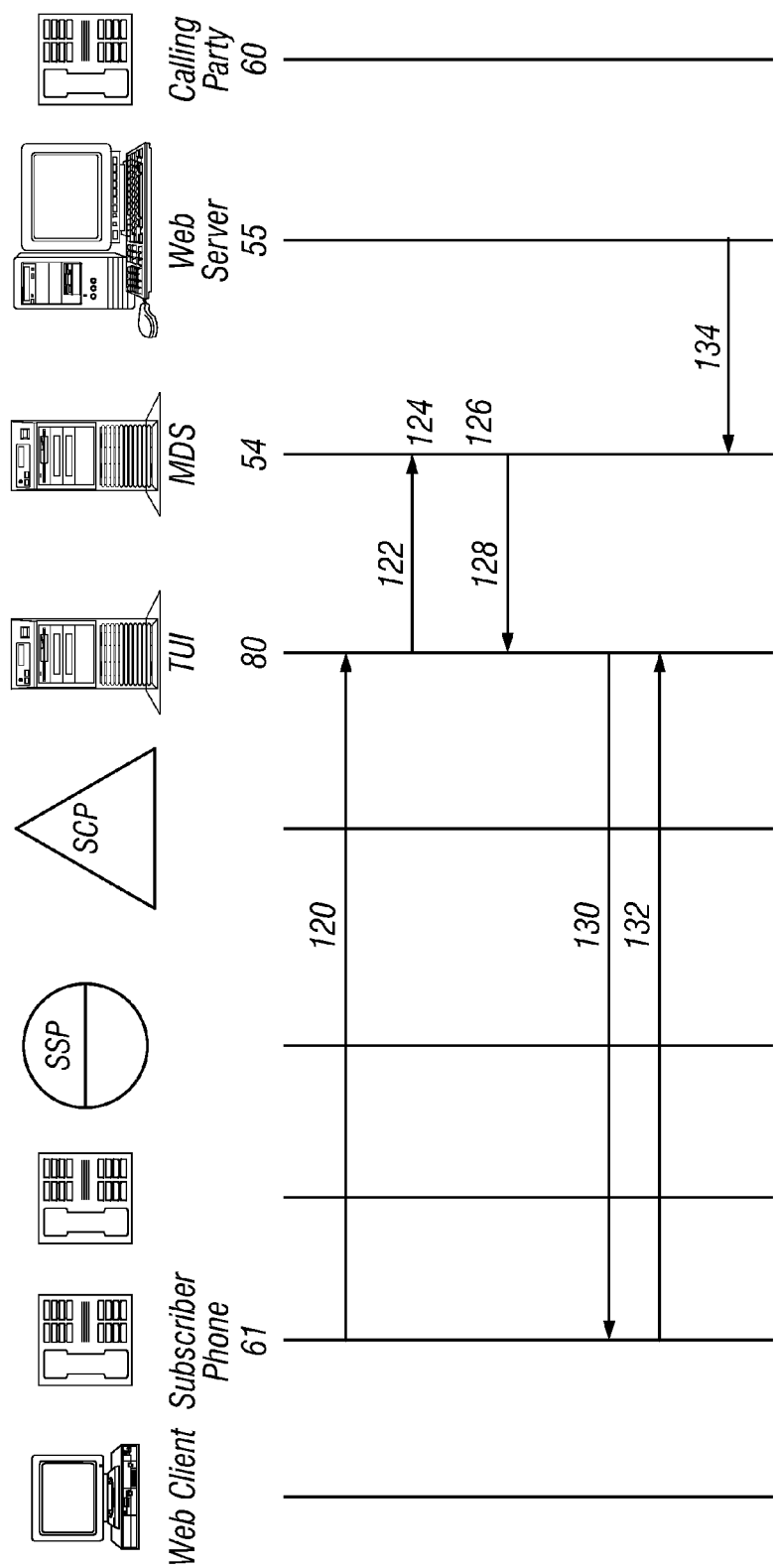
FIG. 8 depicts an example of interaction with voicemail over a Telephone User Interface (TUI) application for providing an Interactive Voice Response (IVR) system, using a DTMF telephone in the present example of the invention.

Exemplary steps through which the subscriber can alternatively interact with VWI information (VWII) using the TUI 80 are now described. The subscriber can access all of the VWI information and voicemail from callers to the subscriber telephone number. FIG. 8 depicts interaction with VWI information over the TUI 80, using a DTMF telephone 61. Turning now to FIG. 8, the subscriber the UMS access number ror their area from any DTMF telephone 61, which directly accesses the TUI Application Server 80, shown at step 120. FIG. 8 depicts, for example, the call originating from the subscriber phone 61. The TUI Application Server 80 receives the call and initiates a request for authentication information, including the account and PIN numbers. These numbers coincide with the account and PIN numbers used to access the voicemail service via the Internet 57. The pre-programmed voice announcements are stored in the MDS and implemented in the TUI Application Server 80. The authentication information is provided using the touch tones of the DTMF telephone 61. The TUI Application Server 80 compares the authentication information in the MDS at step 122 for verification at step 124.

After verification, the system operates in such the same way as described above with respect to a GUI and the Internet. The TUI Application Server 80 retrieves at step 126 the current VWI information, which includes the call forwarding data specific to the subscriber at step 128. The TUI Application Server 80 then verbally recites a menu of options to the subscriber at step 130 based on the information received from the MDS 54. The subscriber listens to the options and inputs various choices at step 132 via the telephone touch tone key pad, including, for example enabling the web interface to voicemail and assigning a username and password for the web interface associated with a subscriber telephone number. The subscriber VWI information is then sent to MDS 54 for storage and later use by the voicemail system.

Returning now to FIG. 6, FIG. 6 indicates the web client 70 being directly connected to the Internet, for example, through a digital subscriber line (DSL) or integrated services digital network (ISDN) digital connection. However, any conventional Internet access may be used, including an analog dial-up connection, through a modem (not pictured) on the subscriber's telephone line and an SSP.

Voice data for the telephone call is transmitted from PSTN 66 or a voice over Internet protocol (VoIP) network including PSTN 66 and VoIP Gateway (GW) 52 and Gatekeeper (GK) 51. The gatekeeper determines where calls coming from the VoIP GW 52 should be routed. Normally calls are routed to TUI Application Servers implemented on Cisco equipment. The VoIP GW provides a bridge between the PSTN and the Internet enabling PSTN telephone calls to be converted into VoIP calls.

A calling party telephone 60 is connected to a local SSP 69 whenever the caller telephone 60 goes "off-hook," (i.e., the handset is removed from the cradle or is otherwise activated to receive a dial tone). The SSP launches an OHD trigger each time the calling party goes off-hook and dials a series of digits adhering to the switch's dial plan is dialed. The OHD trigger activated by the SSP causes call information to be sent to the SSP for processing, via the existing signaling system 7 (SS7) network. SS7 signal standards are well known in the industry. The SS7 call information includes the called party number and the calling party number.

The subscriber may selectively activate and deactivate the service as desired, using the web client 70 via the Internet 57, as discussed below, or using conventional dual tone multi-frequency (DTMF) telephone via the TUI Application Server. Announcements to a subscriber interacting with the system are made using the TUI Application Server. Alternative embodiments of the invention combine the various server and database functions described above into any practical combination of PSTN and data network systems.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a computer readable medium, a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission and public telephone networks represent examples of the state of the art. Such standards are periodically superseded by faster or more efficient equivalents having essentially the same functions. Accordingly, replacement standards and protocols having the same functions are considered equivalents.

What is claimed is:

1. A method of providing a voicemail service, comprising:
providing a first interface to the voicemail service that allows access to the voicemail service over a data network; and
providing a second interface to the voicemail service that allows access to the voicemail service and one of enabling the first interface and disabling the first interface via a telephone.

2. The method of claim 1 wherein the first interface is a web interface that communicates with the data network and the second interface is a user telephone interface that communicates with a telephone network.

3. The method of claim 1 wherein second interface further allows one of creating a username for the first interface; and creating a password for the first interface.

4. The method of claim 1 further comprising setting one of the first interface and second interface with a default initial setting.

5. The method of claim 4 wherein the default initial setting prevents access to the voicemail service via the first interface.

6. The method of claim 1 further comprising providing information for the first interface that includes a first setting which when set allows access to the voicemail service via the first interface and a second setting which when set prevents access to the voicemail service via the first interface.

7. The method of claim 6 wherein providing the information further includes providing a user name for the first interface.

8. The method of claim 7 wherein the user name is other than a telephone number of a subscriber to the voicemail service.

9. The method of claim 6 wherein providing the information includes providing a password for the voicemail service for the first interface.

10. The method of claim 9 wherein the password is other than a telephone number of a subscriber to the voicemail service.

11. A computer-readable medium containing instructions that when executed by a computer perform a method of providing a voicemail service, comprising:
providing a first interface to the voicemail service that allows access to the voicemail service over a data network; and
providing a second interface to the voicemail service that allows access to the voicemail service and one of enabling the first interface to interact with the voicemail service and disabling the first interface from interacting with the voicemail service via a telephone.

12. The computer-readable medium of claim 11 wherein the method further comprises setting the first interface with a default initial setting.

13. The computer-readable medium of claim 11 wherein the method further comprises providing information for the first interface that includes a first setting which when set allows access to the voicemail service via the first interface and a second setting which when set prevents access to the voicemail service via the first interface.

14. The computer-readable medium of claim 13 wherein providing the information includes providing a user name for the first interface.

15. The computer-readable medium of claim 14 wherein the user name is other than a telephone number of a subscriber to the voicemail service.

16. The computer-readable medium of claim 13 wherein providing the information includes providing a password for the voicemail service for the first interface.

17. The computer-readable medium of claim 16 wherein the password is other than a telephone number of a subscriber to the voicemail service.

18. The computer-readable medium of claim 11 wherein the first interface is a web interface that communicates with the data network and the second interface is a user telephone interface that communicates with a network telephone network.

19. The computer-readable medium of claim 11 wherein the second interface further allows one of creating a username for the first interface; and creating a password for the first interface.

20. The computer-readable medium of claim 12 wherein the default initial setting prevents access to the voicemail service via the first interface.

21. A system for providing a voicemail service, comprising:
a first interface to the voicemail service that allows access to the voicemail service over a data network;
a storage medium storing information for the first interface; and
a second interface to the voicemail service that allows access to the voicemail service via a telephone and one of enabling the first interface via the telephone and disabling the first interface via the telephone.

22. The voicemail system of claim 21 further comprising data for setting the first interface with a default initial setting.

23. The voicemail system of claim 21 wherein the information includes a first setting which when set allows access to the voicemail service via the first interface and a second setting which when set prevents access to the voicemail service via the first interface.

24. The voicemail system of claim 21 wherein the information includes a user name for the first interface.

25. The voicemail system of claim 24 wherein the user name is other than a telephone number of a subscriber to the voicemail service.

26. The voicemail system of claim 21 wherein the information includes a password with the voicemail service for the first interface.

27. The voicemail system of claim 26 wherein the password is other than a telephone number of a subscriber to the voicemail service.

28. The voicemail system of claim 21 wherein the first interface is a web interface that communicates with the data network and the second interface is a user telephone interface that communicates with a telephone network.

29. The voicemail system of claim 21 wherein the second interface further allows one of creating a username for the first interface; and creating a password for the first interface.

30. The voicemail system of claim 22 wherein the initial default setting prevents access to the voicemail service via the first interface.

* * * * *